United States Patent [19]

Fly et al.

[11] 4,362,627
[45] Dec. 7, 1982

[54] CELLULAR FLOW SYSTEM AND METHOD

[76] Inventors: Anderson B. Fly; Charles B. Fly, both of 1406 N. Roosevelt, Amarillo, Tex. 79107

[21] Appl. No.: 941,782

[22] Filed: Sep. 13, 1978

[51] Int. Cl.³ ............................................. B01D 15/04
[52] U.S. Cl. .................................... 210/676; 210/189
[58] Field of Search ............... 210/70, 84, 195 R, 201, 210/252, 258, 512 M, 33, 676, 189; 209/144, 211

[56] References Cited

U.S. PATENT DOCUMENTS

| | | | |
|---|---|---|---|
| 3,084,798 | 4/1963 | Lau | 209/211 X |
| 3,627,136 | 12/1971 | Mackrle et al. | 210/201 |
| 3,749,246 | 7/1973 | Hargraves | 210/201 X |
| 3,815,750 | 6/1974 | Mackrle et al. | 210/202 |
| 3,842,004 | 10/1974 | Nagahama | 210/252 X |
| 3,959,144 | 5/1976 | Mackrle et al. | 210/201 |
| 4,142,975 | 8/1979 | Kinzer | 210/201 X |

*Primary Examiner*—Tim R. Miles
*Attorney, Agent, or Firm*—Wendell Coffee

[57] ABSTRACT

A plurality of vortex cells are established in a tank of sea water. Each vortex cell is an individual unit with little mixing with adjacent cells. Cationic and anionic resins are introduced into an initial vortex cell. The resins are diffused through serially adjacent vortex cells and withdrawn from a final vortex cell. Sea water is added to the final vortex cell and purified water is withdrawn from the initial vortex cell, thus counter-flowing the resins and sea water. Water is transferred between cells by pumping. The exhausted resins are rejuvenated using a similar system. The materials removed during the rejuvenation are valuable by-products.

10 Claims, 5 Drawing Figures

CELLULAR FLOW SYSTEM AND METHOD

BACKGROUND OF THE INVENTION (1) Field of the Invention

This invention relates to systems for contacting matter such as ionic material with a fluid or matter contained in the fluid. This invention further relates to desalinating sea water.

(2) Description of the Prior Art

Before our invention sea water desalination was performed by placing sea water in contact with resins in a fixed or floating bed. The most common apparatus filtered or injected the sea water through the fixed or floating bed. The resins had to be periodically replenished or rejuvenated which meant a halting of processing and substitution of fresh resins for the exhausted ones.

Another disadvantage of such prior systems was that relatively large quantities of the ionic resins employed to remove the sodium, chlorine and other elements from the sea water were required. A further disadvantage was that because the contact ratio of the resin to the sea water was relatively low, the resins were used inefficiently.

Similar problems existed with respect to rejuvenating the exhausted resins. Large quantities of power or expensive chemicals were required to restore the resins to their former "regenerated" cationic or anionic state.

Workers outside the desalination art have disclosed using particles or matter physically distinct from the fluid therein. However, the use of such vortices before our invention involved establishing them within separate tanks and exchanging fluid between tanks with appropriate pumping arrangements. The perimeters of the vortices were not in fluid contact and, therefore, intercellular or intervortex diffusion did not occur through a fluid boundary between vortices.

We were aware of the following references prior to filing this application:

Johnson, U.S. Pat. No. 3,455,458
Stoddard, U.S. Pat. No. 3,583,910
Mackrle et al., U.S. Pat. No. 3,815,750
Mackrle et al., U.S. Pat. No. 3,959,144
Schoenrock, U.S. Pat. No. 4,001,113

SUMMARY OF THE INVENTION (1) New and Different Function

We have invented a novel and unique application of fluid vortices. Our invention combines a plurality of adjacent vortex cells to form a cellular flow system. In the cellular flow system the cells are oriented in the fluid such that the matter may diffuse from the perimeter of one cell to the perimeter of an adjacent cell. Matter which is physically distinct from the fluid in which the vortex cells are established is introduced into at least one initial cell and withdrawn from at least one final cell. The introduction of the matter into the initial cell increases the partial pressure of the matter within that cell with respect to adjacent cells not having the same concentration of matter. Diffusion takes place from cell to cell until the matter is withdrawn from the final cell, thereby establishing a diffusion flow of the matter through the system.

An inventive mind could conceive of a limitless number of applications for our invention because of the following qualities it possesses. The matter is intimately associated with the liquid such that the contact ratio of the matter to the liquid is almost infinite. The matter may be suspended within the liquid indefinitely, so long as the turbulence created by the vortices within the vortex cells is sufficient.

By appropriate pumping arrangements the fluid may be transferred from cell to cell without disturbing the vortex configuration by maintaining a constant volume in each cell. This entails removing the same amount of fluid as is introduced into a particular cell. By adding additional fluid to one or more cells, and accomplishing the transfer of fluid between cells, the same amount of fluid as was introduced may be withdrawn from one or more cells, thereby cycling fluid through the cellular flow system for treatment.

We have determined that cellular integrity may be further maintained by establishing contra-rotating vortices. This means that each cell has a different direction of rotation to each adjacent vortex cell.

We have also discovered that it is beneficial to establish a counter-flow of the matter and additional fluid within each cellular flow system. This is accomplished by introducing the additional fluid into the final cell and withdrawing the processed fluid from the initial cell. In this way, the fluid withdrawn from the initial cell in the system will be contacted with the matter having the greatest potency or most desirable characteristics for interaction with the fluid or matter dissolved therein, thereby insuring that the fluid withdrawn from the cellular flow system has the desired characteristics.

We prefer to employ vortex cells having circular cross-sections because this shape is in most instances more easily maintained and integrated in cellular flow systems. However, it will be understood that the cross-section of the vortex cells could be practically any shape whatsoever.

Matter may be dissolved in the fluid and reacting or catalytic matter introduced into the cells. Almost infinite contact may be maintained between the fluid, the matter dissolved therein, and the reacting or catalytic matter.

We have conceived a unique materials handling system wherein matter may be intimately associated with a fluid or other matter within the fluid, which association may be independently controlled. When combined with chemical, electrical, thermodynamic, gravitational and other physical processes, the cellular flow system we have invented has extremely broad applicability and utility.

In addition to permitting a wide range of operations to be performed upon the matter in almost infinite contact with the fluid, cellular flow systems may be combined to accomplish results greater than the results obtained with their employment singularly. This is illustrated by the use of our invention in ion exchange systems.

As stated previously, one problem with ion exchange systems heretofore encountered, especially with regard to the desalination of sea water, is that the resins are located in a bed which does not allow for sufficient contact between the ionic material and the fluid. Our invention permits the ion bed to be suspended within the liquid. We prefer to call the application of cellular flow systems to ionic exchange systems as cellular flow moving bed ion exchange systems, or CFMBI.

In such systems, one cellular flow system in which the fluid can be processed is called an exhaustion circuit. The ionic material and fluid are introduced, as previously described, and cycled through the exhaustion circuit.

The exhausted ionic material withdrawn from the exhaustion circuit is introduced into one or more cellular flow systems having replenishing or rejuvenating fluid therein, called regeneration circuits. The exhausted ionic material is processed through the regeneration circuit and restored to its loaded or potent state. The rejuvenated material is then introduced into the exhaustion circuit, thereby recycling the ionic material through the entire ionic exchange system.

We also have found such ionic exchange systems placed in series are particularly useful in desalinating sea water, or water having a high mineral concentration. Each ionic exchange system removes different elements, which when processed may provide a valuable by-product of the desalination.

Thus, the total function of our invention far exceeds the sum of the functions of the individual component parts, i.e., manifolds, resins, sea water, pumps, tanks, etc.

(2) Objects of this Invention

An object of this invention is to contact matter with a fluid.

Another object is to contact such matter with other matter within the fluid.

A third object is to perform chemical, electrical, mechanical and other physical operations upon such matter while it is in contact with such fluid.

A fourth object is to exchange elements of such matter for elements contained in such fluid.

A fifth object is to desalinate sea water.

A sixth object is to produce minerals and other elements from sea water.

Further objects are to achieve the above with a device that is sturdy, durable, simple, safe, efficient, versatile, ecologically compatible, energy conserving, and reliable, yet relatively inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

A plurality of serially adjacent vortex cells 10, each having a vortex 12 therein, are established within sea water 14 contained in tank 16 to form a cellular flow system. Each of the cells 10 has a cell axis and a direction of rotation. We prefer to orient the cells 10 within the tank 16 with the cell axes parallel and serially adjacent. Each cell 10 has a perimeter 18 and a cell center 20 which contains the cell axis. Boundaries 22 are the volumes of sea water between adjacent cells 10. The vortex cells 10 are in fluid communication within the tank 16. "Vortex", as used herein, is a mass of fluid having a whirling or circular motion. Some examples of vortices are whirlpools or eddies.

The vortex cells 10 are each a specific volume of fluid having volumetric integrity. Each cell has negligible fluid exchange with other adjacent cells at the boundaries 22. Therefore, the fluid characteristics within cells may be different from the fluid characteristics of all other cells within the system. Although for this embodiment of my invention I prefer to employ a single vortex within each cell, it will be understood that each cell could contain more than one vortex 12.

Figure 1:
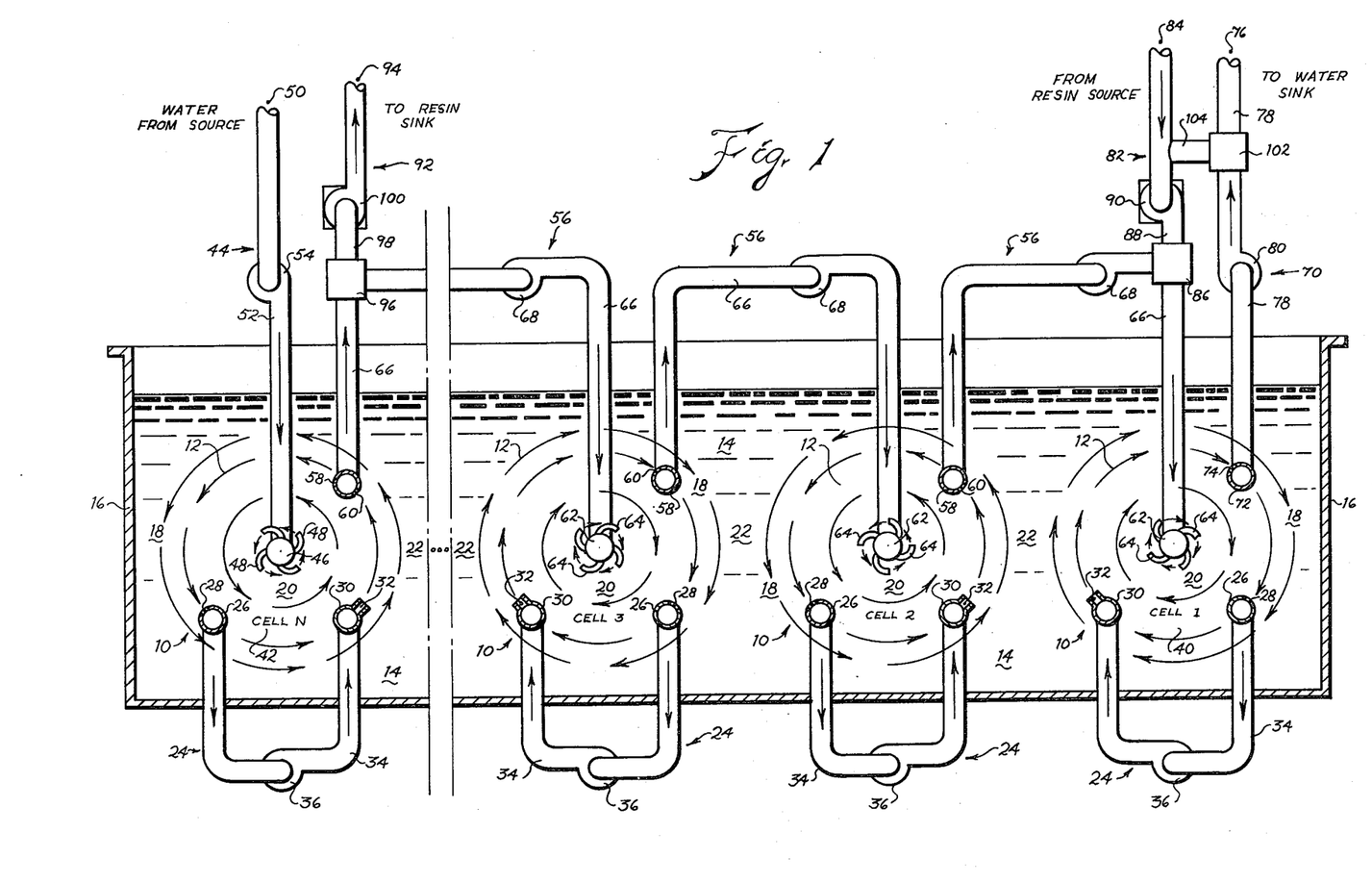
FIG. 1 is a schematic representation of a cellular flow system having N number of cells, the initial three and the final N cell being schematically represented.

Matter, ionic material, or anionic and cationic resins are introduced into initial vortex cell 40 (shown in FIG. 1 as Cell 1). The resins are in the form of beads as are well known and commercially available. As the differential partial pressure in the initial cell 40 is increased, diffusion of resins will occur across the boundary 22 to the adjacent cell 10 (shown in FIG. 1 as Cell 2). The diffusion of the resins into the adjacent vortex cell 10 will also result in an increased differential partial pressure within that adjacent cell 10 (Cell 2), thereby diffusing the resins to the serially adjacent cell 10 (shown in FIG. 1 as Cell 3).

As used herein, "fluid" includes both gases and liquids, including any matter behaving as a fluid, such as semiliquids and solid particles suspended in a fluid. As used herein, "matter" includes any liquid, gas, or solid which is physically distinct from the fluid with which it is contacted.

Diffusion will occur serially throughout the cellular flow system until the concentration of the matter or resins within the system is equalized. The matter within each cell is brought into almost infinite contact with the fluid by the vortices of the cell. By withdrawing the resins from the final cell, (shown in FIG. 1 as Cell N) after serial diffusion has occurred through all the cells in the system, a continuous diffusion flow may be maintained at a selected rate. Thus, the resins may be diffused through the system and kept in almost infinite contact with the sea water 14 until exhausted, at which time they may be withdrawn from the final cell 42.

Figure 2:
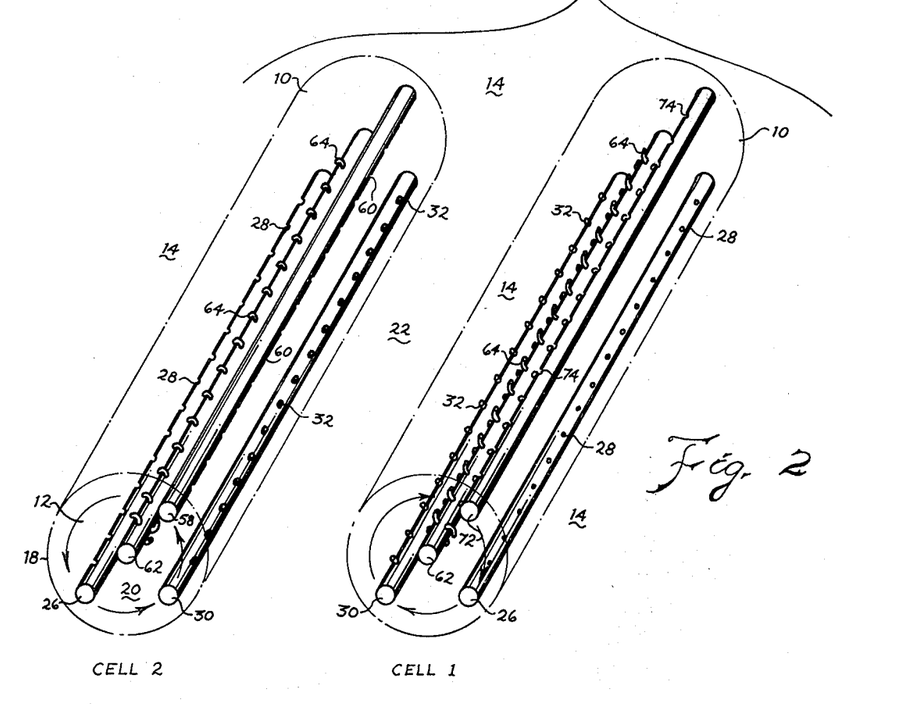
FIG. 2 is a schematic perspective representation of two adjacent cells and the manifolds associated therewith.

Each of the cells 10 is established and maintained by fluid transfer mechanism or fluid transfer means 24. The fluid transfer mechanism 24 includes suction transfer manifold 26 with suction openings 28 therein (FIGS. 1 and 2). The suction transfer manifold 26 is connected to discharge manifold 30 having discharge nozzles 32 thereon by transfer header 34. Transfer pump 36 within the transfer header 34 pumps the fluid 14 from the suction transfer manifold 26 through the transfer openings 28 to the discharge transfer manifold 30 and through the transfer nozzles 32. The transfer openings 28 are oriented on the suction transfer manifold 26 such that the fluid is withdrawn from the direction of rotation of the cell. The discharge transfer nozzles 32 are oriented on the discharge tranfer manifold 30 such that they discharge the water 14 pumped from the transfer openings 28 in the direction of rotation of the cell.

Each of the vortex cells 10 are, therefore, established by creating a convection flow of fluid i.e. sea water 14 by pressurizing one point and depressurizing another point in the fluid. The pressure generated by the discharge from the transfer nozzles 32 creates convection of the fluid at that point in the body of the sea water 14 in one direction. The suction or depressurizing of another point in the fluid causes a flow of fluid toward the transfer openings 28. The flow thus causes a movement of the fluid 14 between the two points in a circular fashion.

Although other than circular cross-sections could be employed, we find such circular shapes more easily maintained and integrated into cellular flow systems. It should also be noted that the energy required to pump the fluid from one point in the cell to another and thereby establish the vortex 12 is much less than the energy required to move an equivalent amount of fluid as is present in each cell. Thus, pumping costs for our invention may be reduced in comparison with fixed bed or other moving bed ion exchange systems. There is one of the transfer mechanisms 24 for each of the cells 10.

It will be understood that although we prefer to employ the pumping arrangements described to establish and maintain the vortex cells 10 and the vortices 12 within them, other mechanisms and methods may be employed to induce the vorticial movement with the cells 10. Paddles may be employed to stir the fluid along the cell axis and causing rotation thereabout. Another example would be heat exchange wherein the water is heated at one point in the fluid and cooled at another point. Certain fluids may be induced to rotate by magnetic flux or a magnetic field to impart momentum to the fluid at certain points. In summary, almost any mechanism or method for imparting velocity to a fluid in a given direction of flow about an axis may be employed to establish a vortex cell and the vortices 12 therein.

As the resins diffuse through each of the vortex cells 10, they will react with the sea water 14 to adsorb the elements therein. The diffusion of the resins through the sea water 14 extracts the elements from the sea water, thereby exhausting the resins. After the resins have become exhausted to the extent that they no longer adsorb the desired elements, they are withdrawn from the final cell 42 as described above.

It is also desirable to process sea water or other water having a high mineral content through the system and to withdraw purified water after the resins have removed the undesired elements. We have discovered that it is extremely beneficial to introduce the additional sea water into the final cell, and to remove purified water from the initial cell, thereby creating a counter flow of resins and water. The sea water in the initial cell prior to withdrawal is partially purified and brought into contact with the resins in their most potent state, thereby insuring removal to the desired extent of the elements. Additionally, the introduction of additional sea water in the final cell brings water having a high mineral content in contact with the weakened resins, thereby insuring the full utilization of the resins.

We choose not to have diffusion flow for the fluids as with the matter or resins. The value of the cellular flow system is that the characteristics of the fluid or sea water within each of the cells 10 may be different from the fluid in the other cells 10 at other points in the system. Therefore, it is necessary to maintain cell volumetric integrity. We have found that this may be accomplished by observing two guidelines.

First, each of the cells 10 must be established such that the vortices 12 in each cell are contra-rotating with respect to the vortices in adjacent cells. As shown by the arrows indicating the flow of the vortices in the drawing, the direction of flow at the boundary 22 of each of the cells 10 is the same. The friction between cells is minimized, thereby minimizing intercellular exchange of fluid.

Figure 3:
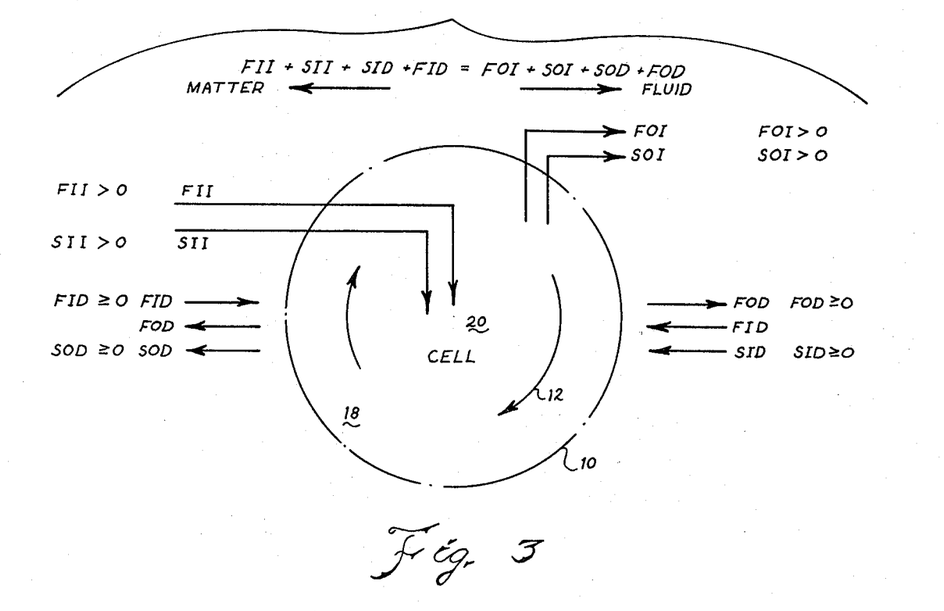
FIG. 3 is a representation of the flows associated with a single cell illustrating volumetric equilibrium.

The second guideline is to maintain cell volumetric equilibrium. As shown in FIG. 3, the volumetric integrity of each of the cells 10 may be maintained by insuring that the sum of fluids in, fluids out, matter in, and matter out, equal zero.

As represented in FIG. 3, the sum of the fluids and matter in must equal the sum of fluids and matter out. "FII" represents fluid in by injection. This includes the fluid introduced into the cell through the discharging exchange manifold 62. For this embodiment, "SII", matter (solid) in by injection, is the matter either mixed with or withdrawn with the fluid drawn from one cell and introduced into another. "SID" is the matter in by diffusion. Normally, the SII will occur at the initial cell and the SID will occur and be a positive number for the serially adjacent cells and the final cell. "FID" is fluid in by diffusion. The amount of fluid in by diffusion will ordinarily be negligible if these two guidelines of contra-rotating cells and volumetric equilibrium are maintained.

"FOI" represents fluids out by injection or withdrawal. "SOI" relates to matter out by injection or withdrawal. Thus for a cell, the fluid and matter therein withdrawn from one cell to be injected into another cell is FOI with the SOI being separated from the FOI at the separators. "SOD" relates to matter out by diffusion. This will occur and be a positive number for the intermediate cells and the initial cell. "FOD" represents the fluid out by diffusion. As with the FID, this quantity will be negligible inasmuch as the contra-rotating cellular flows and the volumetric equilibrium maintained with the other six elements will insure that FOD and FID are negligible. Therefore, the equation of equilibrium may be seen to be $$FII+SII+SID+FID=FOI+SOI+SOD+FOD$$

which represents all of the inputs and outputs of each cell.

Therefore, for this embodiment the FII introduced into Cell 1 through discharge exchange manifold 62 will equal the FOI withdrawn through the suction withdrawal manifold 74. Again, the contra-rotating flows of adjacent cells may be seen to minimize the friction between cells and prevent intercellular exchange fluid, thereby minimizing FOD and FID. In any event, inasmuch as FOI and FII have been maintained equally, the exchange of fluid into and from the Cell 1 by diffusion across the boundary 22 to Cell 2 must necessarily be equal.

SID for Cell 1 will approximate zero inasmuch as the flow of resin is from Cell 1 through successive cells to Cell N. SOI will approximate zero inasmuch as any matter or resins withdrawn through the suction withdrawal manifold 72 are separated at separator 102 and reintroduced to Cell 1 through the discharge manifold 62. Therefore, SOD, as the diffusion of the matter from Cell 1 to Cell 2, at equilibrium must equal SII which is the injection of the matter through the discharge exchange manifold 62. This may be seen to naturally occur inasmuch as the differential partial pressure of the matter or resins of Cell 1 will cause a diffusion flow from Cell 1 to Cell 2 equivalent to the rate of matter or resins being introduced through the discharge exchange manifold 62.

For each of the adjacent cells 2, 3, through N1, FOD and FID again will be equal and will approximate zero, and SID and SOD will be slightly positive. In view of this, it may be seen that the concentrations of matter or resins within each cell are approximately constant. This is necessary because SII less SOI will be negative numbers. The fluid injected into each cell by the discharge exchange manifold will have a lower concentration of matter therein than does the cell into which the fluid is injected. FII and FOI are approximately equal in order to maintain the fluid volumetric equilibrium in each cell.

In view of the fact that matter is withdrawn from one cell through the suction exchange manifold 58 and injected into an adjacent cell against the diffusion flow of the matter or resins into an adjacent cell through the discharge exchange manifold 62, there may be seen to be a recycling of matter against the diffusion flow. We have found this to have some beneficial effect inasmuch as this partial recycling of the matter or resins imparts greater stability to the desalination process with relatively more exhausted resins being mixed with more potent resins in one cell, thereby controlling the action of the resins with the fluid within the cell. However, it is noted no resins are circulated out of Cell 1 nor any resins circulated into Cell N.

For Cell N, the fluid in by injection or FII through the discharge injection manifold 46 must equal the FOI withdrawn through the suction exchange manifold 58. The SID introduced into the Cell N from the Cell N−1 will equal the SOI withdrawn through the suction exchange manifold 58 in Cell N. The values of SOD from Cell N and SII into Cell N will approximate zero. As before, the values of FOD and FID will be negligible. Therefore, the values of fluid introduced into the system as a whole and withdrawn from the system must be equal. The volumes of resins or matter introduced into the entire system and withdrawn from the entire system must be equal. Therefore, the pumping rates of the exchange pumps 68, the withdrawal pump 80 and the injection pump 54 must be equal. We prefer to employ air lift pumps to insure these equal pumping rates for each of these pumps.

The transfer of sea water from cell to cell and the addition and withdrawal of sea water and purified water, respectively, into and from the system is accomplished by the combination of fluid injection mechanism or fluid injection means 44, fluid mechanism or fluid exchange means 56, and fluid withdrawal mechanism or fluid withdrawal means 70.

The fluid injection mechanism 44 includes injection manifold 46 within the cell center of the final cell (Cell N) having injection nozzles 48 thereon connected to source of additional sea water or fluid 50 by injection header 52 having injection pump 54 therein. The injection nozzles 48 are oriented on the injection manifold 46 such that they discharge the injected additional sea water in the direction of rotation of the final vortex cell 42 as shown by the arrows in the drawing. The injection pump pumps additional sea water from the sources 50 into the final cell 42. However, because the volume of the cell 10 has been increased at the rate of pumping by the injection pump 54, fluid must be removed at an equivalent rate from the cell 42.

The fluid exchange mechanism 56 includes suction exchange manifold 58 having exchange openings 60 therein connected to discharge exchange manifold 62 having exchange nozzles thereon by exchange header 66 having exchange pump 68 therein. The suction exchange manifold 58 is located at the perimeter of each of the cells 10 with the exception of the initial cell 40. The discharge exchange manifold 62 is located in the cell center 20 of each of the cells 10, with the exception of the final cell 42. The exchange openings 60 are oriented on the suction exchange manifolds 58 such that they withdraw fluid or sea water 14 from the direction of rotation of each cell 10, as shown in the drawing. The exchange nozzles 64 are oriented on discharge exchange manifold 62 such that they discharge fluid in the direction of rotation of each of the cells 10. The exchange pump 68 pumps water 14 from the final cell and each of the cells 10, with the exception of the initial cell 40, into an adjacent cell 10 opposite the diffusion flow of resins or matter through the exchange nozzles 64 on the discharge exchange manifold 62. In this way serial exchange of fluid between adjacent vortex cells 10 is accomplished.

The fluid withdrawal mechanism 70 includes withdrawal manifold 72 proximate the perimeter of the initial cell 40 having withdrawal openings therein connected to sink of processed water 76 by withdrawal header 78 having withdrawal pump 80 therein. The withdrawal openings 74 within the withdrawal manifold 72 are oriented such that they withdraw fluid or water 14 from the direction of rotation of the initial cell 40. The withdrawal pump 80 pumps processed water from the initial cell 40 to the sink of processed water 76. Thus, the injection mechanism 44, exchange mechanism 56 and withdrawal mechanism 70 in combination provide the means for cycling the sea water 14 through the cellular flow system to purification.

Matter injection mechanism or matter injection means 82 includes source of fresh resins 84 connected to mixer 86 within the exchange header 66, leading to the discharge exchange manifold 62 within the initial cell 40, by matter injection header 88 having matter conveyor 90 therein. The mixer 86 mixes the resins pumped thereto by the matter conveyor 90 from the source of fresh resins 84, with fluid or water 14 being conveyed from the cell (Cell 2) adjacent the initial cell 40 to the initial cell 40. (Cell 1).

The injected matter diffuses through the system until it reaches the final cell 42 (Cell N). Matter withdrawal mechanism or matter withdrawal means 92 includes sink of exhausted resins 94 connected to separator 96 within the exchange header 66 connected to the suction exchange manifold 58 within the final cell 42 (Cell N) by matter withdrawal header 98 having matter conveyor 100 therein. The separator 96 separates the exhausted resins from the fluid withdrawn from the final cell 42.

The withdrawn fluid is conveyed to the discharge exchange manifold 62 within the adjacent cell (Cell N−1, Cell 3 in the drawing). The matter or resins separated are conveyed by the matter conveyor 100 to the sink of exhausted resins 94. Thus, the matter injection mechanism 82 and matter withdrawal mechanism 92 provide for cycling the resins through the cellular flow system to facilitate the purification of the sea water.

The purified water withdrawn from the initial cell 40 will necessarily have some of the matter or resins therein. Therefore, we prefer to place separator 102 in the fluid withdrawal header 78 to separate the processed fluid or purified water from the fresh resins introduced therein. Separater header 104 connects the separator 102 to the matter injection header 88, which returns the withdrawn resins to the initial cell 40.

It will be understood that separate manifolds to perform the equivalent function of the suction exchange manifold at the perimeter of the final cell 42 and the discharge exchange manifold within the cell center 20 of the initial cell 40 for the matter injection and matter withdrawal mechanism 82 and 92. However, the use of such headers and manifolds may cause unnecessary turbulence within the system and require additional expensive structure. The separators and mixer could still be required. We prefer to employ the mixer and separator in the exchange headers 66 and the separator in the withdrawal header 78 as described for simplicity of structure and economy of operation.

Alternatively, the resin could be introduced into the initial cell 40 by merely dumping the resin into the tank at the perimeter of the cell 40 and allowing the resin to mix within and diffuse from the cell 40. However, we prefer to mix the resins with the injected fluid, thereby achieving a higher contact ratio initially within the initial cell 40.

Thus, our invention cycles sea water through a cellular flow moving bed ionic exchange system to purify it and simultaneously counter-flows fresh resins through the cellular flow moving bed ion exchange system to exhaust them by purifying the sea water and adsorbing the elements which are undesired in the sea water.

Figure 4:
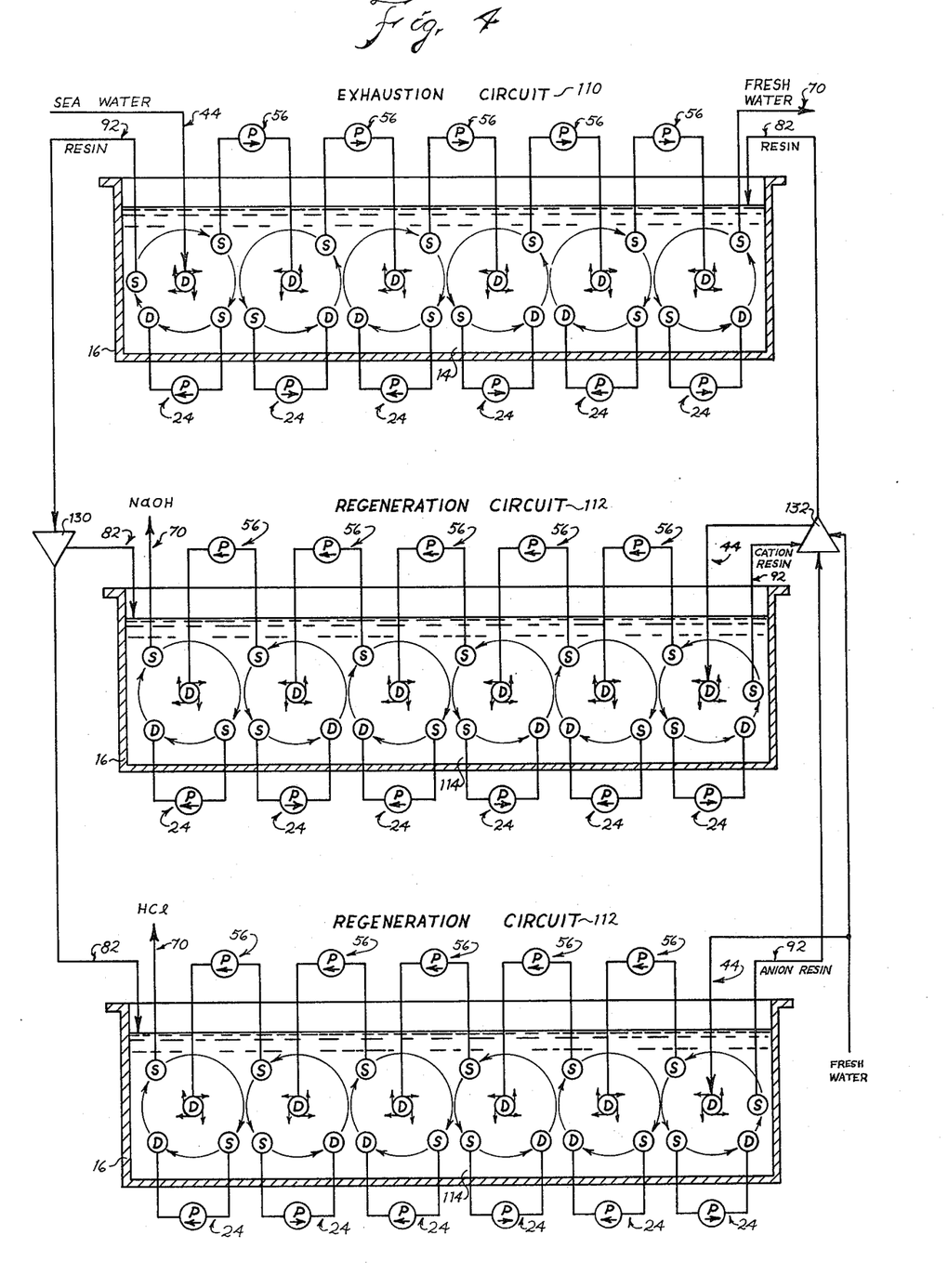
FIG. 4 is a schematic representation of a cellular moving bed ion exchange system for sea water.
Figure 5:
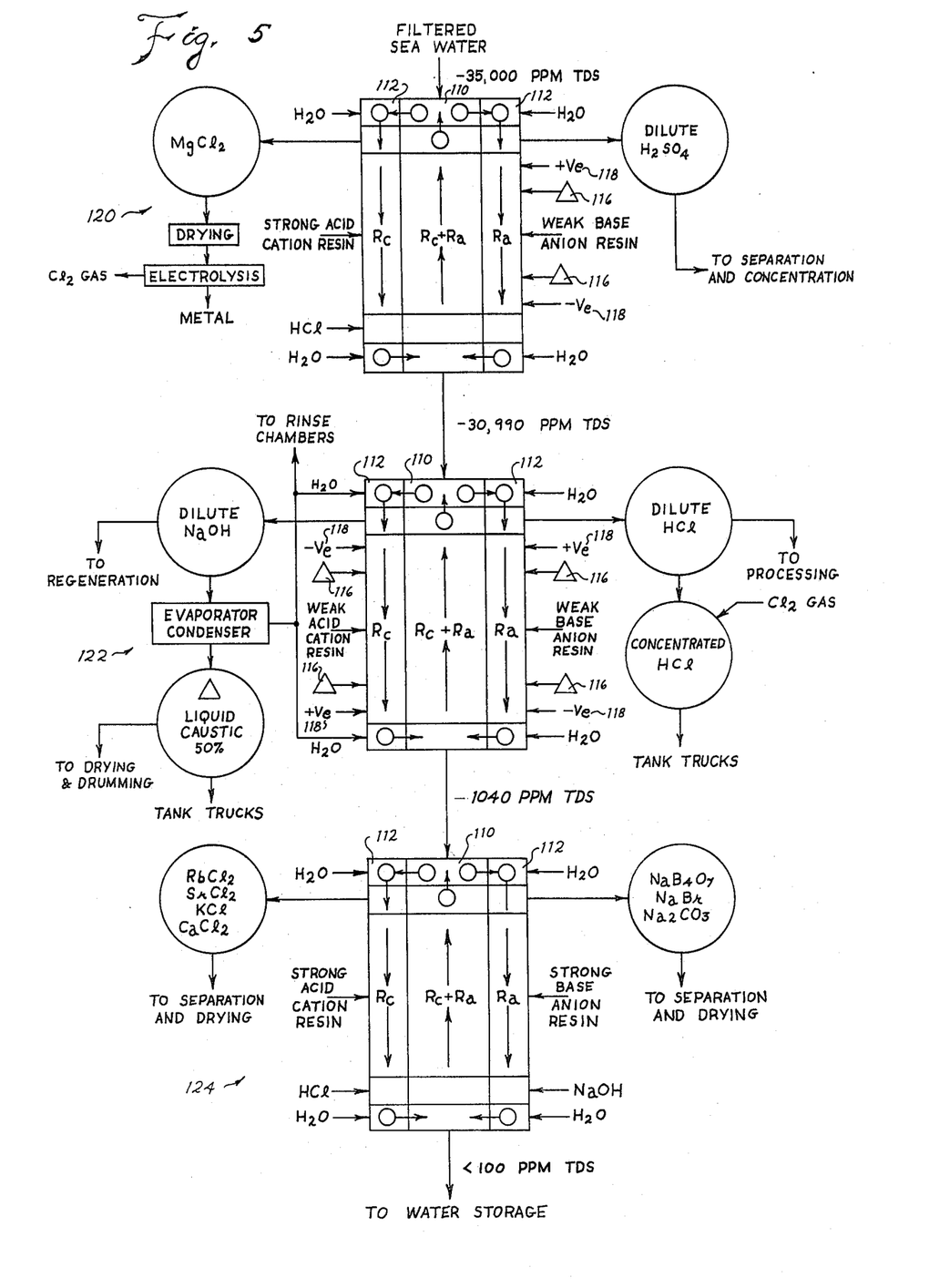
FIG. 5 is a plan view of a desalination plant schematically represented with the flows indicated.

Complete System of FIGS. 4 and 5

Our invention, cellular flow systems, may be further employed in the form of a cellular flow moving bed ion exchange system to rejuvenate the exhausted resins and to make available the elements and minerals withdrawn from the sea water. We prefer to call the desalination cellular flow system previously described as exhaustion circuit 110. We prefer to call the cellular moving bed ion exchange systems to rejuvenate the resins and to process the elements from the sea water into pure form as regeneration circuit 112.

The rejuvenation circuits 112 are substantially identical to the exhaustion circuit 110 previously described, with the exception that the fluid within the tank 16 is rejuvenating fluid 114. The rejuvenation circuits 112 in combination with the exhaustion circuit 110 form cellular flow moving bed ion exchange system or a CFMBI System. The exhausted resins are separated into cationic and anionic fractions by conventional separator 130. They are rejuvenated by conventional reagents and then mixed by mixer 132 prior to injection into the exhaustion circuit 110.

Electrolysis, heat exchange, or other mechanical, electrical or chemical processes may be performed within a cell 10 of the CFMBI System to accomplish the reaction of the rejuvenating fluid 114 and resins to release the elements adsorbed by the resins during exhaustion. This is shown substantially in FIG. 5, where the water suspending the exhausted resins in CFMBI element is heated by heaters 116 and subjected to electrolysis by plates 118 to rejuvenate the resins and to release the elements to form the compounds indicated.

Various types of resins, including weak base anionic resins, weak acid cationic resins, strong base anionic resins, and strong acid cationic resins may be employed as appropriate for removal of the elements as shown. We prefer to employ electrolysis and heating of the rejuvenation fluid and the sea water being processed in association with weak base anionic or weak acid cationic resins to increment the reaction between the elements dissolved in the sea water and the resins or with the rejuvenating fluid and the resins containing the absorbed elements.

Although the resins necessary to remove all of the desired elements could be processed through a single CFMBI unit such as shown in FIG. 4, the practicality of separating and processing the resultant combination of elements and minerals would be difficult and extremely complicated. By arranging CFMBI units in series as shown in FIG. 5, elements may be removed as desired. In these forms, the elements are easily separated to facilitate the processing of the elements removed to obtain them in their commercial form.

Those with ordinary skill in the desalination art will be intimately familiar with the resin and rejuvenation fluids necessary to accomplish the desalination and rejuvenation processes. Therefore, the compounds and chemicals mentioned herein are not specifically described in order to avoid unnecessarily complicating and lengthening the description. Moreover, it will be understood that a great variety of resins and chemical compounds may be employed with our invention for processing brackish water or other water having high mineral concentrations or for the removal of elements in other fluids.

Therefore, CFMBI 120 removes sulfur in the form of dilute sulfuric acid and magnesium in the form of magnesium chloride, which are processed further to obtain them in their commercial form, and thereby reducing the total dissolved solids to approximately 30,990 ppm. Then, CFMBI 122 may be seen to remove sodium in the form of sodium hydroxide and chloride in the form of hydrogen chloride from the softened and filtered sea water, reducing the total dissolved solids to approximately 1,040 ppm. Finally, CFMBI 124 processes other indicated elements from the rejuvenation circuits of that CFMBI unit. These compounds are further processed into their commercial forms, resulting in purified water with total dissolved solids of less than 100 ppm. Additional CFMBI units may be employed in series to remove other elements from the sea water or water having a high mineral concentration, as desired.

The construction and operation of the CFMBI units of FIGS. 4 and 5 are readily apparent from the drawings and require little or no explanation.

The embodiment shown and described above is only exemplary. We do not claim to have invented all the parts, elements or steps described. Various modifications can be made in the construction, material, arrangement, and operation, and still be within the scope of our invention. The limits of the invention and the bounds of the patent protection are measured by and defined in the following claims. The restrictive description and drawing of the specific example above do not point out what an infringement of this patent would be, but are to enable the reader to make and use the invention.

We claim as our invention:

1. The improved structure for contacting matter physically distinct from a fluid with said fluid comprising: a matter physically distinct from a fluid, a. at least two adjacent vortices with diffusion boundaries therebetween, the vortices fluidly existing within and fluidly connected with a body of said fluid,
b. matter injection means for introducing said matter into at least one of said vortices, and
c. matter removal means for withdrawing said matter from at least one of said vortices,
d. at least two vortex cells,
e. each of said vortex cells having at least one of said vortices therein,
f. each of said vortex cells having
   (i) a rotational center,
   (ii) a direction of rotation,
   (iii) a perimeter distal of the center, and
g. each of said vortex cells being adjacent at least one other vortex cell,
h. fluid injection means including
   (i) a fluid discharge point in a mechanism proximate the center of at least one of said vortex cells, and
   (ii) injection pump means connecting the fluid discharge point with a source of additional fluid for pumping said fluid from said source of additional fluid to said fluid discharge point, and
j. fluid removal means including
   (i) a fluid removal point in a mechanism proximate the perimeter of at least one of said vortex cells, and
   (ii) removal pump means connecting said fluid removal point with a sink of processed fluid for pumping said fluid from at least one of said vortex cells to said sink of processed fluid.

2. The invention as defined in claim 1 further comprising:
k. said matter injection means being a mechanism for adding said matter to fluid which is discharged through one of said fluid discharge points, and
m. said matter removal means being a mechanism for separating said matter from the fluid withdrawn from one of said fluid removal points.

3. The improved structure for contacting matter physically distinct from a fluid with said fluid comprising: a matter physically distinct from a fluid,
a. at least two adjacent vortices with diffusion boundaries therebetween, the vortices fluidly existing within and fluidly connected with a body of said fluid,
b. matter injection means for introducing said matter into at least one of said vortices, and
c. matter removal means for withdrawing said matter from at least one of said vortices,
d. at least two vortex cells,
e. each of said vortex cells having at least one of said vortices therein,
f. each of said vortex cells having
   (i) a rotational center,
   (ii) a direction of rotation,
   (iii) a perimeter distal of the center, and
g. each of said vortex cells being adjacent at least one other vortex cell,
h. fluid transfer means for transferring said fluid from at least one suction transfer point within each of said vortex cells to at least one discharge transfer point within the same vortex cell, thereby inducing rotation of the fluid within each of said vortex cells about said center in a given direction of rotation.

4. The invention as defined in claim 3 with said fluid transfer means further comprising:
j. pump means connecting said suction transfer point to said discharge transfer point for pumping said fluid from the suction transfer point to the discharge transfer point, and
k. said discharge point being such that the fluid is discharged in the direction of rotation.

5. The improved structure for contacting matter physically distinct from a fluid with said fluid comprising: a matter physically distinct from a fluid,
a. at least two adjacent vortices with diffusion boundaries therebetween, the vortices fluidly existing within and fluidly connected with a body of said fluid,
b. matter injection means for introducing said matter into at least one of said vortices, and
c. matter removal means for withdrawing said matter from at least one of said vortices,
d. at least two vortex cells,
e. each of said vortex cells having at least one of said vortices therein,
f. each of said vortex cells having
   (i) a rotational center,
   (ii) a direction of rotation,
   (iii) a perimeter distal of the center, and
g. each of said vortex cells being adjacent at least one other vortex cell,
h. fluid exchange means connecting at least two of said vortex cells for withdrawing said fluid from at least one of said vortex cells and introducing said withdrawn fluid into at least one other vortex cell,
j. at least one suction exchange point in a mechanism proximate the perimeter of at least one of said vortex cells,
k. at least one discharge exchange point in a mechanism proximate the center of at least one other of said vortex cells, and
m. fluid pump means connecting the suction exchange point and the discharge exchange point for removing said fluid from said suction exchange point and discharging said removal fluid at said discharge exchange point.

6. The improved structure for contracting matter physically distinct from a fluid with said fluid comprising: a matter physically distinct from a fluid,
a. at least two adjacent vortices with diffusion boundaries therebetween, the vortices fluidly existing within and fluidly connected with a body of said fluid,
b. matter injection means for introducing said matter into at least one of said vortices, and
c. matter removal means for withdrawing said matter from at least one of said vortices,
d. at least two vortex cells within a tank containing said fluid,
e. each of said vortex cells having at least one of said vortices therein,
f. each of said vortex cells having
   (i) a laterally extending rotational axis,
   (ii) a direction of rotation, and
   (iii) a perimeter distal of the center,
g. fluid injection means for introducing additional fluid into at least one of said vortex cells including
   (i) a laterally extending discharge injection manifold about parallel to and proximate said rotational center of at least one of said vortex cells, (ii) said discharge injection manifold having injection nozzles mounted thereon,
(iii) said injection nozzles being such that fluid is discharged through them in said direction of rotation, and
(iv) pump injection means for pumping said additional fluid from a source of additional fluid to said discharge injection manifold and through said injection nozzles, h. fluid removal means for withdrawing processed fluid from at least one of said vortex cells including
  (i) a laterally extending suction removal manifold about parallel to said rotational center and proximate the perimeter of at least one of said vortex cells,
  (ii) said suction removal manifold having removal openings therein, and
  (iii) said removal openings being such that processed fluid is withdrawn through them from said direction of rotation,
  (iv) pump removal means for pumping said processed fluid from said suction removal manifold to a sink of processed fluid, j. said processed fluid being withdrawn at approximately the same rate as said additional fluid is introduced, and k. fluid transfer means for transferring said fluid from at least one suction transfer point within one of said vortex cells to at least one discharge transfer point within said vortex cell, thereby inducing rotation of the fluid within said vortex cell about said center in said given direction of rotation, and thereby establishing said vortex cells, m. said fluid transfer means including
  (i) at least one laterally extending discharge transfer manifold about parallel to said rotational center,
  (ii) said discharge transfer manifold having directional transfer nozzles thereon,
  (iii) said transfer nozzles being such that fluid is discharged through them in said direction of rotation,
  (iv) at least one laterally extending suction transfer manifold about parallel to said rotational center and distal of said discharge transfer manifold within said cell,
  (v) said suction transfer manifold having transfer openings therein,
  (vi) said transfer openings being oriented such that fluid is withdrawn through them from the direction of rotation, and
  (vii) pump means inter-connecting said suction transfer manifold and said discharge transfer manifold for pumping said fluid from said suction transfer manifold to said discharge transfer manifold, n. fluid exchange means connecting at least two of said vortex cells for withdrawing said fluid from at least one of said vortex cells and introducing said withdrawn fluid into at least one other vortex cell, o. fluid exchange means including
  (i) at least one laterally extending suction exchange manifold about parallel to said rotational center and proximate said perimeter of said vortex cell,
  (ii) said suction exchange manifold having suction exchange openings therein,
  (iii) said suction exchange openings being oriented such that fluid is withdrawn through them from said direction of rotation,
  (iv) at least one laterally extending discharge exchange manifold about parallel to and proximate said rotational center of said other vortex cell,
  (v) said discharge exchange manifold having discharge exchange nozzles thereon,
  (vi) said exchange nozzles being oriented such that the fluid is discharged through them in the direction of rotation, p. each of said vortex cells having volumetric integrity such that
  (i) each of said vortex cells having a discharge injection manifold therein also having a suction exchange manifold therein,
  (ii) each of said vortex cells having a suction removal manifold therein also having a discharge exchange manifold therein,
  (iii) each of said fluid exchange means not having a discharge injection manifold or suction withdrawal manifold therein and having a suction exchange manifold therein also having a discharge exchange manifold therein,
  (iv) each of said vortex cells not having a discharge injection manifold or a suction withdrawal manifold therein and having a discharge exchange manifold therein also having a suction exchange manifold therein, and
  (v) the amount of fluid discharged from said discharge exchange manifold and said discharge injection manifold within one of said cells being equal to the amount of fluid withdrawn by said suction exchange manifold or said suction withdrawal manifold for that cell.

7. The invention as defined in claim 6 further comprising:
  q. the transfer manifolds within each of said vortex cells and the transfer nozzles and transfer openings therein being oriented such that the vortex of each vortex cell adjacent a vortex in an adjacent vortex cell has an opposite direction of rotation to that of the adjacent vortex of the adjacent vortex cell.

8. The improved method of contacting matter physically distinct from a fluid with said fluid comprising the steps of:
  a. establishing at least two adjacent fluidly connected vortex cells with diffusion boundaries therebetween within a body of said fluid,
  b. introducing said matter into at least one of said cells designated as an initial vortex cell, thereby,
  c. contacting said matter with the fluid in said vortex cell,
  d. inducing diffusion migration of said matter into at least one adjacent vortex cell,
  e. contacting said matter with the fluid in said adjacent vortex cell, and
  f. withdrawing said matter from at least one of said adjacent vortex cells,
  g. moving fluid from at least one suction transfer point in said fluid,
  h. to at least one discharge transfer point, and
  j. discharging said pumped fluid at said discharge transfer point in a direction of rotation, thereby
  k. establishing at least one vortex having said direction of rotation about said suction and discharge points.

9. The improved method of contacting matter physically distinct from a fluid with said fluid comprising the steps of:
 a. establishing at least two adjacent fluidly connected vortex cells with diffusion boundaries therebetween within a body of said fluid,
 b. introducing said matter into at least one of said cells designated as an initial vortex cell, thereby,
 c. contacting said matter with the fluid in said vortex cell,
 d. inducing diffusion migration of said matter into at least one adjacent vortex cell,
 e. contacting said matter with the fluid in said adjacent vortex cell, and
 f. withdrawing said matter from at least one of said adjacent vortex cells,
 g. introducing additional fluid from a source of additional fluid in at least one initial vortex cell,
 h. cycling said fluid through adjacent vortex cells to a final cell by
 j. withdrawing approximately the same amount of fluid from one vortex cell into which additional fluid has been introduced,
 k. introducing said withdrawn fluid into at least one adjacent vortex cell, and
 m. performing steps (i) and (ii) until said fluid has been introduced into said final vortex cell, and
 n. withdrawing approximately the same amount of fluid as was introduced into said final vortex cell from said final vortex cell to the sink of processed fluid, thereby
 o. cycling additional fluid through said vortex cells,
 p. contacting said fluid with said matter, and processing said fluid while
 q. maintaining cell volumetric integrity.

10. The improved method of contacting matter physically distinct from a fluid with said fluid comprising the steps of:
 a. establishing at least two adjacent fluidly connected vortex cells with diffusion boundaries therebetween within a body of said fluid,
 b. introducing said matter into at least one of said cells designated as an initial vortex cell, thereby,
 c. contacting said matter with the fluid in said vortex cell,
 d. inducing diffusion migration of said matter into at least one adjacent vortex cell,
 e. contacting said matter with the fluid in said adjacent vortex cell, and
 f. withdrawing said matter from at least one of said adjacent vortex cells,
 g. introducing said matter into at least one initial cell at one end of said body of fluid,
 h. diffusing said matter through said adjacent cells to a final vortex cell,
 j. withdrawing said matter from said final vortex cell,
 k. introducing said additional fluid into said final vortex cell,
 m. serially transferring said fluid from one vortex cell to an adjacent vortex cell until fluid is transferred into said initial vortex cell,
 n. withdrawing said fluid from said initial vortex cell, thereby extablishing a cross-flow of said fluid and said matter.

* * * * *